United States Patent [19]
Mogamiya

[11] Patent Number: 5,243,591
[45] Date of Patent: Sep. 7, 1993

[54] PROTECTING A READ/WRITE HEAD FROM DAMAGE

[75] Inventor: Makoto Mogamiya, Tokyo, Japan

[73] Assignee: Asahi Kogaku Kogyo Kabushiki Kaisha, Tokyo, Japan

[21] Appl. No.: 685,731

[22] Filed: Apr. 16, 1991

[30] Foreign Application Priority Data

Apr. 23, 1990 [JP] Japan .................. 2-108454
Apr. 25, 1990 [JP] Japan .................. 2-111242

[51] Int. Cl.$^5$ .................. G11B 21/22; G11B 3/58
[52] U.S. Cl. .................. 369/244; 369/71; 369/219
[58] Field of Search .............. 369/215, 219, 71, 72, 369/244, 292; 360/104, 105, 106, 128, 137, 109

[56] References Cited

U.S. PATENT DOCUMENTS

| 3,602,517 | 8/1971 | Sehnal | 274/4 R |
|---|---|---|---|
| 3,881,734 | 5/1975 | Leedom | 369/71 |
| 4,166,623 | 9/1979 | Nanbu et al. | 369/71 |
| 4,556,890 | 12/1985 | Hermanson et al. | 346/74.4 |
| 4,609,956 | 9/1986 | Torii et al. | 360/128 X |
| 4,611,257 | 9/1986 | Shiroyama et al. | 360/104 |
| 4,709,286 | 11/1987 | Koike | 360/105 |
| 4,742,410 | 5/1988 | Smith | 360/105 |
| 4,786,995 | 11/1988 | Stupeck et al. | 360/75 |
| 4,791,508 | 12/1988 | Augeri et al. | 360/105 X |
| 4,831,480 | 5/1989 | Takeda | 360/106 |
| 4,835,646 | 5/1989 | Kurosawa et al. | 360/109 |
| 4,841,397 | 6/1989 | Maeda | 360/105 |
| 4,864,445 | 9/1989 | Tezuka | 369/215 X |
| 4,866,554 | 9/1989 | Stupeck et al. | 360/105 |
| 4,901,430 | 2/1990 | Noguchi et al. | 29/603 |
| 4,903,157 | 2/1990 | Malek | 360/105 |
| 4,935,830 | 6/1990 | Hiraoka et al. | 360/128 |
| 4,989,109 | 1/1991 | Morisawa | 360/106 |

FOREIGN PATENT DOCUMENTS

| 59-36373 | 2/1984 | Japan . | |
| 0294945 | 12/1990 | Japan | 369/292 |

Primary Examiner—Eugene R. LaRoche
Assistant Examiner—Tan Nguyen
Attorney, Agent, or Firm—Sandler Greenblum & Bernstein

[57] ABSTRACT

A disk storage device, such as a magnetic disk storage device, for reading data from and writing data to a magnetic data storage disk includes a spindle onto a base for rotating the magnetic storage disk and a read/write head for reading data from and writing data to the magnetic storage disk. The read/write head is supported on a carriage which is movably mounted on the base for radially moving with respect to the spindle. A support plate is mounted on the carriage for retractably supporting the read/write head. An actuator mechanism actuates the support plate to move the read/write head between a nonretractable, operative position and a retracted, inoperative position. When the disk is not accessed by the read/write head, the read/write head is held in the retracted, inoperative position. Therefore, when the disk is replaced with another disk, the read/write head is prevented from being damaged or smeared with dust or dirt by contact with the disk.

22 Claims, 8 Drawing Sheets

PROTECTING A READ/WRITE HEAD FROM DAMAGE

The present disclosure relates to subject matter contained in Japanese patent application No. HEI 2-108454 (filed on Apr. 23, 1990) and Japanese patent application No. NEI 2-111242 (filed on Apr. 25, 1990) which are expressly incorporated hereby by reference in their entirety.

BACKGROUND OF THE INVENTION

Field of the Invention

The present invention relates to a disk storage device for recording data on and/or reproducing recorded data from a data storage disk, such as an optical disk, a magnetic disk, or the like.

Description of the Relevant Art

Optical disk storage devices are known for optically or magneto-optically recording data and/or reproducing data from an optical disk or a magneto-optically disk with a laser beam, and a magnetic disk storage device for magnetically recording data and/or reproducing data from a magnetic disk. These known disk storage devices are used in a wide variety of applications, including image storage devices for electronic still cameras, audio compact disc players, etc.

The disk storage devices include a rotating mechanism having a spindle for rotating a data storage disk, the rotating mechanism being mounted on a base of the device. The disk storage devices also include a read/write head for reading data from and writing data onto the data storage disk, the read/write head being supported on a carriage which is movably disposed on the base for moving the read/write head radially with respect to the spindle.

Some disk-replaceable optical disk storage devices, such as audio compact disc players, for example, have an openable lid which can be opened by the user for manual disk replacement. However, when a disk is replaced with another disk, the surface of a lens, which emits and receives a laser beam, may be damaged or smeared with dust or dirt, resulting in impaired performance of the optical head.

Fixed disk drives are widely used as secondary storage devices for use with computers. The fixed disk drives include magnetic hard disks fixed to spindles, and magnetic heads for recording data on the magnetic hard disks. In one kind of such fixed disk drives, when the magnetic head is not accessing a disk, the magnetic head is positioned in confronting relation to a data-free region on an outer circumferential edge portion of the disk. With the magnetic head being thus positioned, any recorded data on the disk is prevented from being destroyed even if the magnetic head collides with the surface of the disk under shocks or impacts which might be applied to the disk drive while the disk drive is being transported. Since no data is recorded in the data-free region, no data would be destroyed by accidental contact of the magnetic head with the data-free region. However, the magnetic head may be damaged upon hitting the data-free region of the disk.

Electronic still cameras, portable word processors, etc. usually have built-in floppy disk drives as data storage devices. The built-in floppy disk drives are possibly subjected to relatively large impacts. Special care should be taken in the designing of the carriage of the magnetic head so that the magnetic head will not hit and be damaged by a floppy disk which may be mounted either completely or incompletely, or by a wall of the disk drive close to the magnetic head if no floppy disk is mounted. Such special design considerations are however conducive to an increase in the cost of the disk drive.

SUMMARY OF THE INVENTION

It is an object of the present invention to provide a disk storage device which is free of the conventional drawbacks.

According to the present invention, there is provided a disk storage device comprising a base, rotative drive means mounted on the base for rotating a data storage disk, the rotative drive means having a spindle for rotating the data storage disk, a read/write head for reading data from and writing data onto the data storage disk, a carriage that is movably mounted on the base, the read/write head being supported on the carriage, carriage moving means mounted on the base for radially moving the carriage with respect to the spindle, support means mounted on the carriage for retractably supporting the read/write head, and means for actuating the support means to move the read/write head between a nonretractable operative position and a retracted inoperative position.

According to one aspect of the present invention, the actuating means comprises means for actuating the support means in response to radial movement of the carriage with respect to the spindle.

According to another aspect of the present invention, the carriage moving means comprises means for moving the carriage to move the read/write head between a radially inner access region and a radially outer data-free region, the actuating means comprising means for moving the read/write head from the operative position to the inoperative position when the read/write head is moved from the access region to the data-free region, and for moving the read/write head from the inoperative position to the operative position when the read/write head is moved from the data-free region to the access region.

According to still another aspect of the present invention, the support means comprises a support plate that is angularly movably mounted to the carriage, the read/write head being supported on the support plate, the actuating means comprising means for angularly moving the support plate in a first direction to move the read/write head from the operative position to the inoperative position, and for angularly moving the support plate in a second direction to move the read/write head from the inoperative position to the operative position wherein the actuating means comprises a spring means mounted to the carriage for biasing the support plate in the second direction, stop means mounted on the carriage for engaging the support plate under the bias of the the spring means, thereby holding the read/write head in the operative position, and engaging means mounted on the base for engaging the support plate in response to a radially outward movement of the carriage with respect to the spindle, thereby angularly moving the support plate in the first direction against the bias of the spring means.

According to a further aspect of the present invention, the disk storage device further comprises means for substantially covering the read/write head to protect the read/write head when the read/write head is in the retracted inoperative position.

According to a still further aspect of the present invention, the disk storage device further comprises means for cleaning a functional surface of the read/write head in contact therewith when the read/write head is in the retracted inoperative position.

When the read/write head is not accessing the data storage disk, the read/write head is held in the retracted inoperative position. Therefore, when the data storage disk is replaced with another data storage disk, the read/write head is prevented from being damaged by contact with the disk, or prevented from being smeared by dust or dirt which would otherwise be applied to the functional surface of the read/write head.

The above and other objects, features and advantages of the present invention will become more apparent from the following description when taken in conjunction with the accompanying drawings in which preferred embodiments of the present invention are shown by way of illustrative example.

DETAILED DESCRIPTION OF THE PREFERRED EMBODIMENTS

Figure 1:
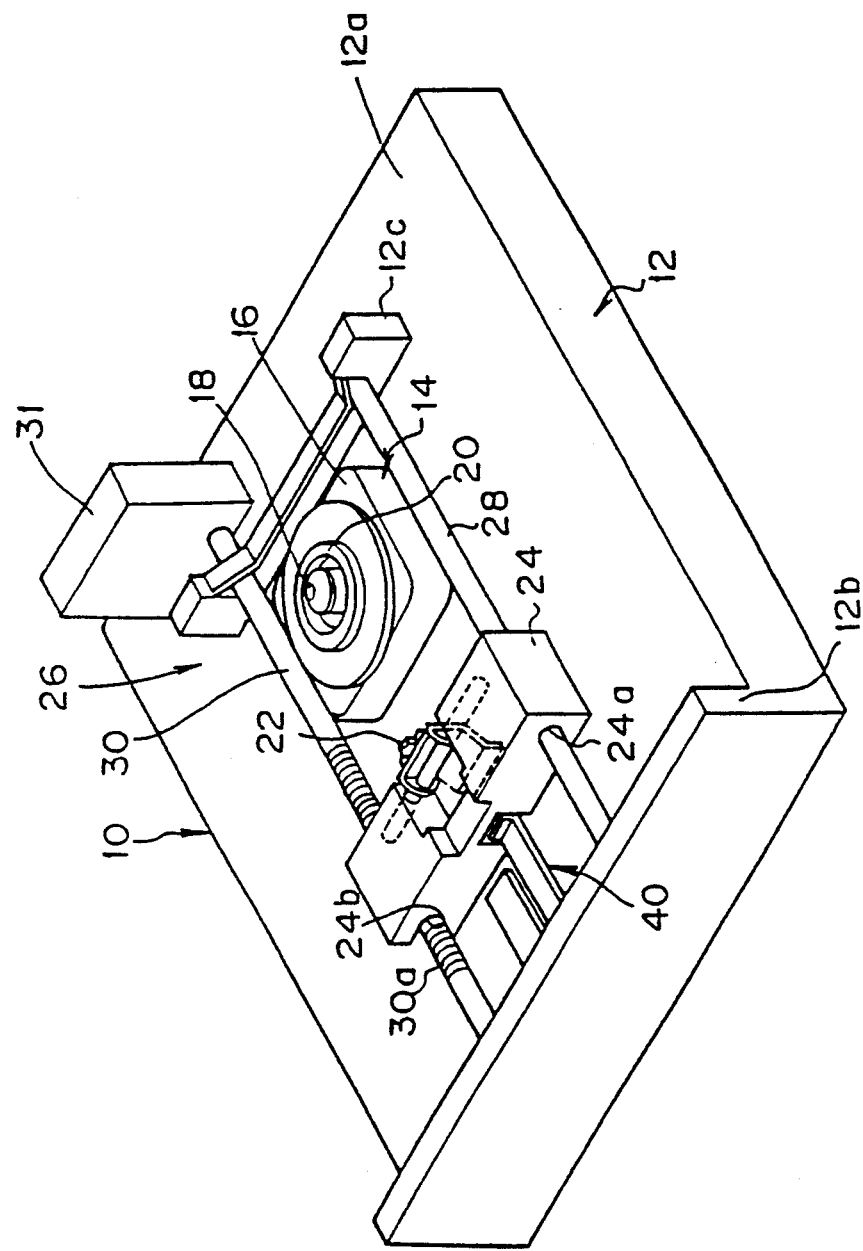
FIG. 1 is a perspective view of a disk storage device according to an embodiment of the present invention, the view showing a mechanical structure of the disk storage device.

FIG. 1 shows a mechanical structure of a disk storage device, generally designated by the reference numeral 10, according to an embodiment of the present invention. The disk storage device 10 in the illustrated embodiment uses a replaceable magnetic disk as a data storage medium. However, the principles of the present invention are not limited to the illustrated type of disk storage device, but may be applied to a disk storage device with an optical disk and other disc storage devices with an irreplaceable data storage medium.

The disk storage device 10 has a base 12 on which there is mounted a rotative drive mechanism 14 for controllingly rotating a magnetic storage disk (not shown). The rotative drive mechanism 14 includes a spindle motor 16 which has a spindle 18 as a drive shaft for rotating the disk. A magnetic chuck 20 mounted on the spindle 18 has a built-in magnet (not shown) for magnetically attracting the metal hub of the disk to hold the disk on the spindle 18. The spindle motor 16 and the magnetic chuck 20 may be controlled in a known manner by any of various control mechanisms known in the art of disc storage devices. The control method and arrangements will not be described in detail below, as they do not have a direct bearing on the present invention.

In actual use, the disk storage device 10 is accommodated in a housing (not shown) of some sort, which may have a closable lid and a slit for inserting a disk. The disk may be loaded onto and unloaded from the magnetic chuck 20 either manually or through a suitable loading/unloading mechanism.

The data storage device 10 has a magnetic read/write head 22 for reading data from and writing data on the disk. The magnetic head 22 is supported on a carriage 24 which is movable radially with respect to the spindle 18 by a carriage moving mechanism 26 that is mounted on the base 12.

The term "radially"0 used herein is referred to with respect to the spindle 18. Unless particularly noted otherwise, the term "radially" should be interpreted as being related to the spindle 18.

The carriage moving mechanism 26 comprises a pair of parallel rods, i.e., a guide rod 28 and a lead screw rod 30. These rods 28, 30 extend above and parallel to an upper surface 12a of the base 12 and are disposed on one each side of the spindle 18. The rods 28, 30 have opposite ends supported by spaced upstanding walls 12b, 12c of the base 12.

The carriage 24 has a through hole 24a defined in one end thereof for receiving the guide rod 28 and a U-shaped cross section groove 24b defined in the other end for receiving the lead screw rod 30. The lead screw rod 30 has an externally threaded portion 30a whose teeth are held in mesh with the teeth of a semicylindrical internally threaded portion on a round bottom of the U-shaped groove 24b.

The lead screw rod 30 is rotatably supported between the upstanding walls 12b, 12c, and can be controllably rotated about its own axis by a rod rotating mechanism 31 mounted on the base 12 and coupled to one end of the lead screw rod 30 which extends beyond the wall 12c. When the lead screw rod 30 is rotated about its own axis by the rod rotating mechanism 31, the carriage 24 is guided along the guide rod 28 for movement radially with respect to the spindle 18. The movement of the carriage 24 is effected to cause the magnetic head 22 to seek a particular recording track on the magnetic disk and also to move the magnetic head 22 in a radially inner access region where the magnetic head 22 can access recording tracks on the disc and also between the radially inner access region and a radially outermost data-free region. The rod rotating mechanism 31 may comprise various known actuators, such as a motor, and may be controlled in any of various known methods in the art of disk storage devices.

Figure 2:
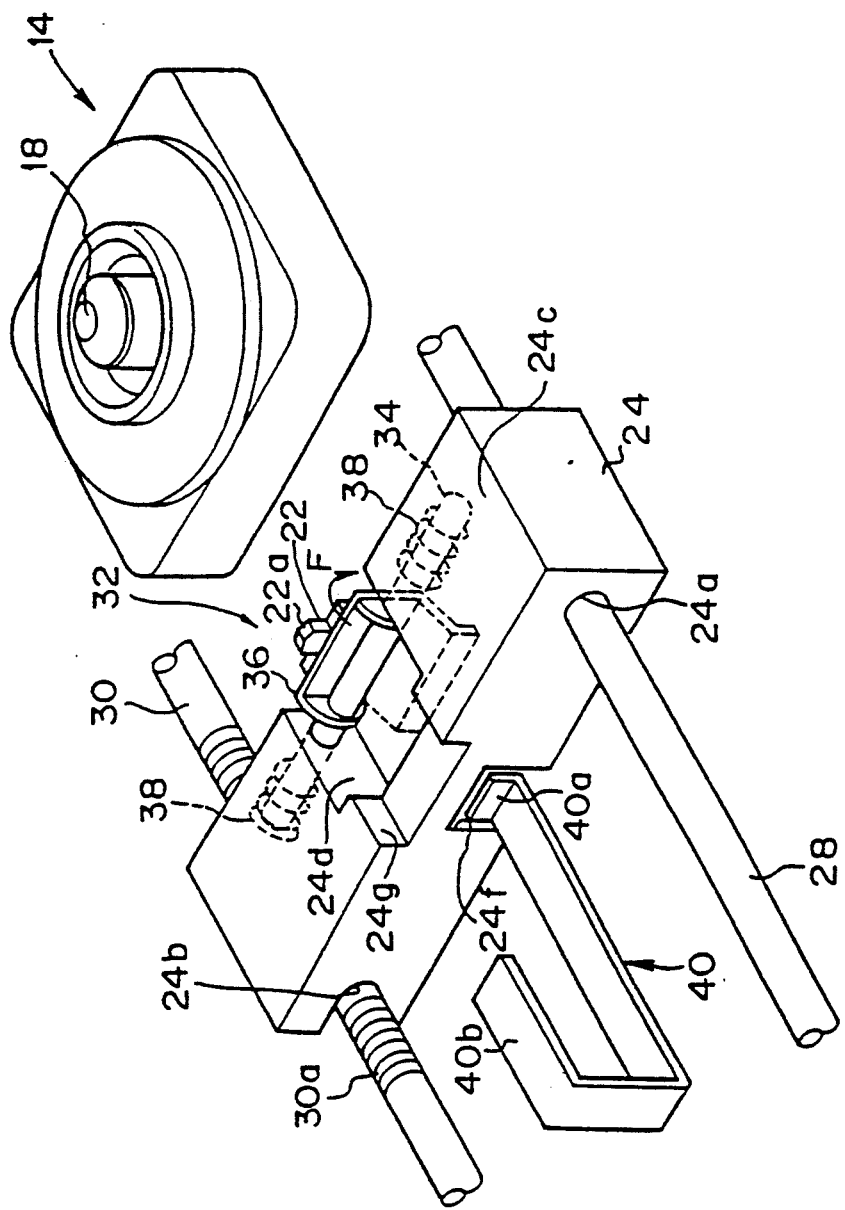
FIG. 2 is an enlarged fragmentary perspective view of a carriage and a read/write head in the disk storage device shown in FIG. 1
Figure 3:
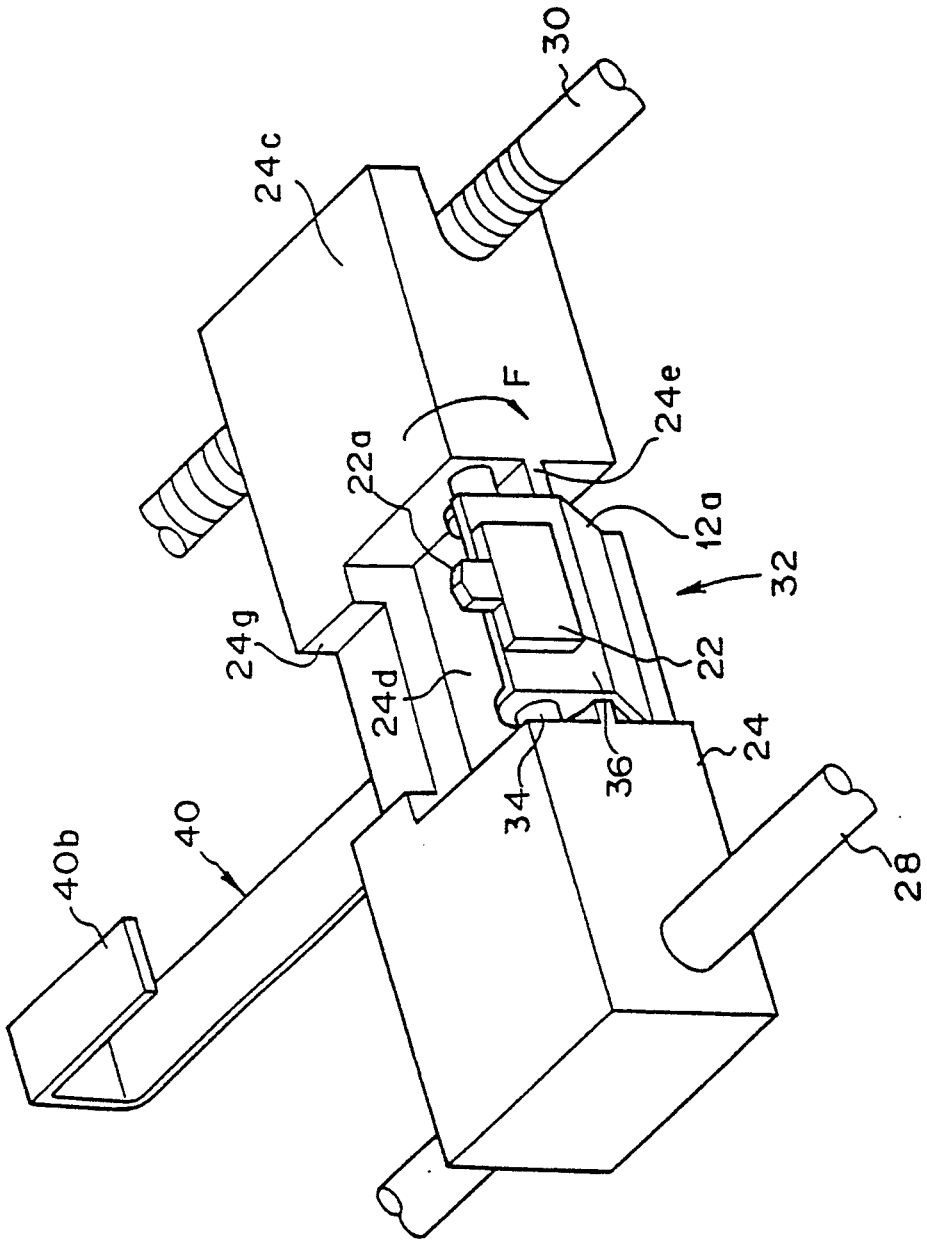
FIG. 3 is an enlarged fragmentary perspective view of the carriage and the read/write head shown in FIG. 2, the carriage and the read/write head being viewed in a different direction.
Figure 4:
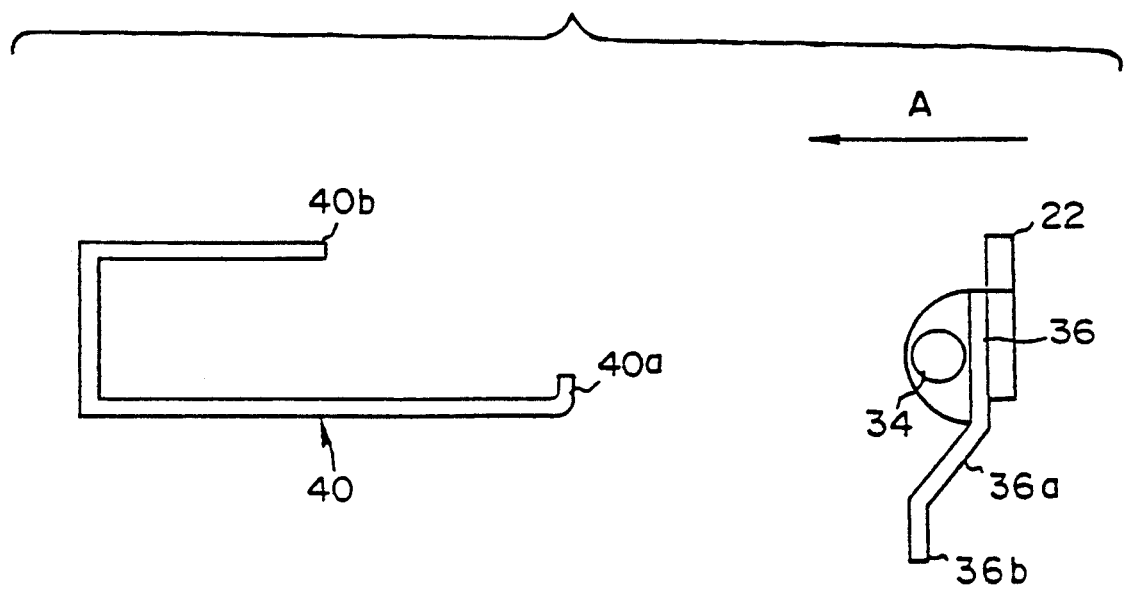
FIG. 4 is a side elevational view of the read/write head in an operative position and an engaging member engageable with a support plate of the read/write head in the disk storage device shown in FIG. 1.

The magnetic head 22 is supported on the carriage 24 by a support mechanism 32, as shown in FIGS. 2 and 3. The support mechanism 32 comprises a pivot shaft 34 rotatably supported on the carriage 24, and a swingable support plate 36 fixed to the pivot shaft 34. The magnetic head 22 is securely mounted on the support plate 36. The pivot shaft 34 extends in a plane which lies perpendicular to the axis of the spindle 18. When the support plate 36 is angularly moved by the pivot shaft 34 about the axis of the pivot shaft 34, the magnetic head 22 can be moved between an operative position, and an inoperative position as described below.

Operative position: When the magnetic head 22 is in the operative position, as shown in FIGS. 1 through 4, the magnetic head 22 can access any recording track on the disk. In the operative position, a functional surface 22a of the magnetic head 22 for reading and writing data is positioned upwardly of an upper surface 24c of the carriage 24 and held in contact with the surface of the disk in confronting relationship. The operative position may be referred to as a nonretractable position, in which the magnetic head 22 cannot be retracted away from the disk surface.

Figure 5:
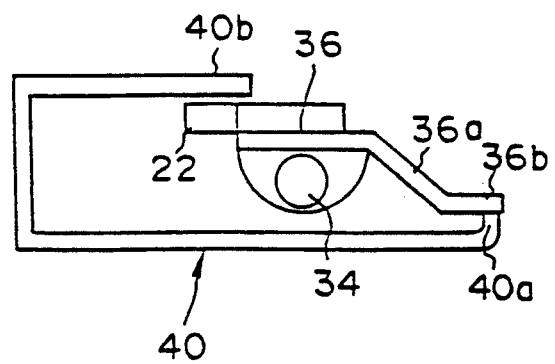
FIG. 5 is a side elevational view of the read/write head in an inoperative position and the engaging member in the disk storage device shown in FIG. 1.
Figure 6:
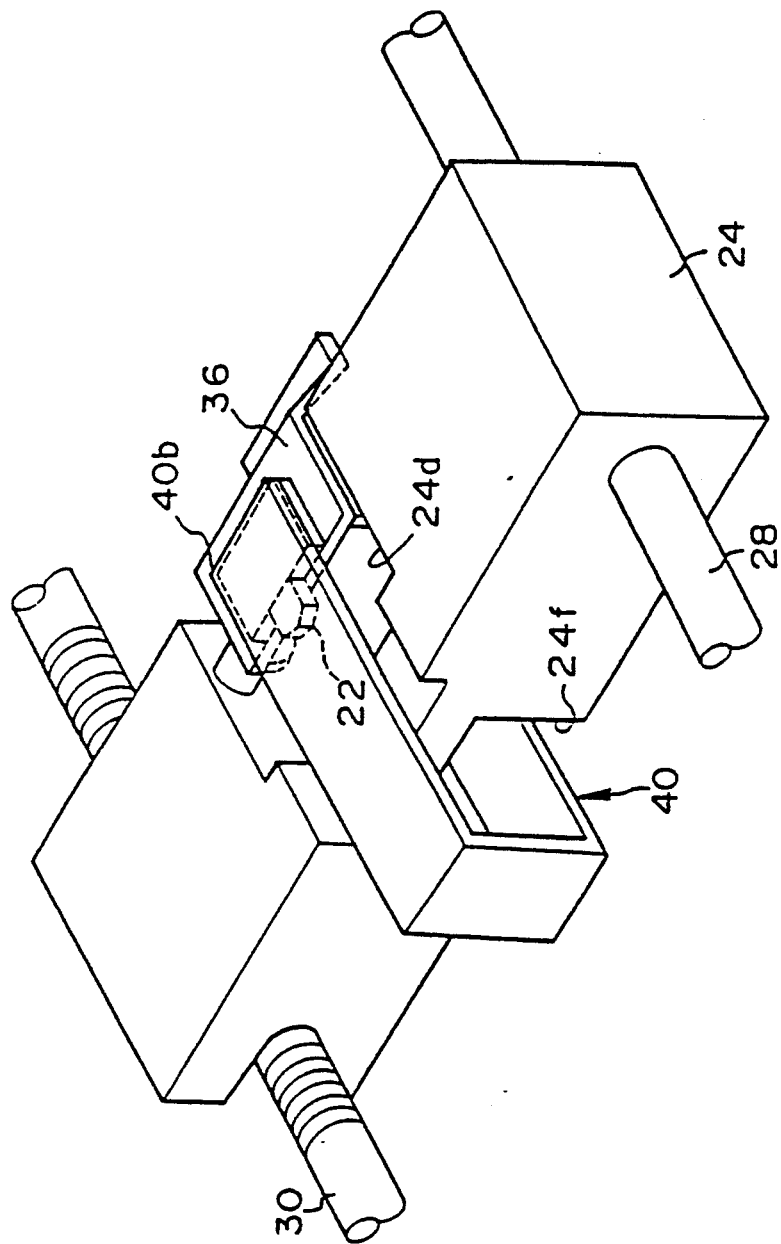
FIG. 6 is an enlarged fragmentary perspective view of the read/write head in the inoperative position and the carriage in the disk storage device shown in FIG. 1.
Figure 7:
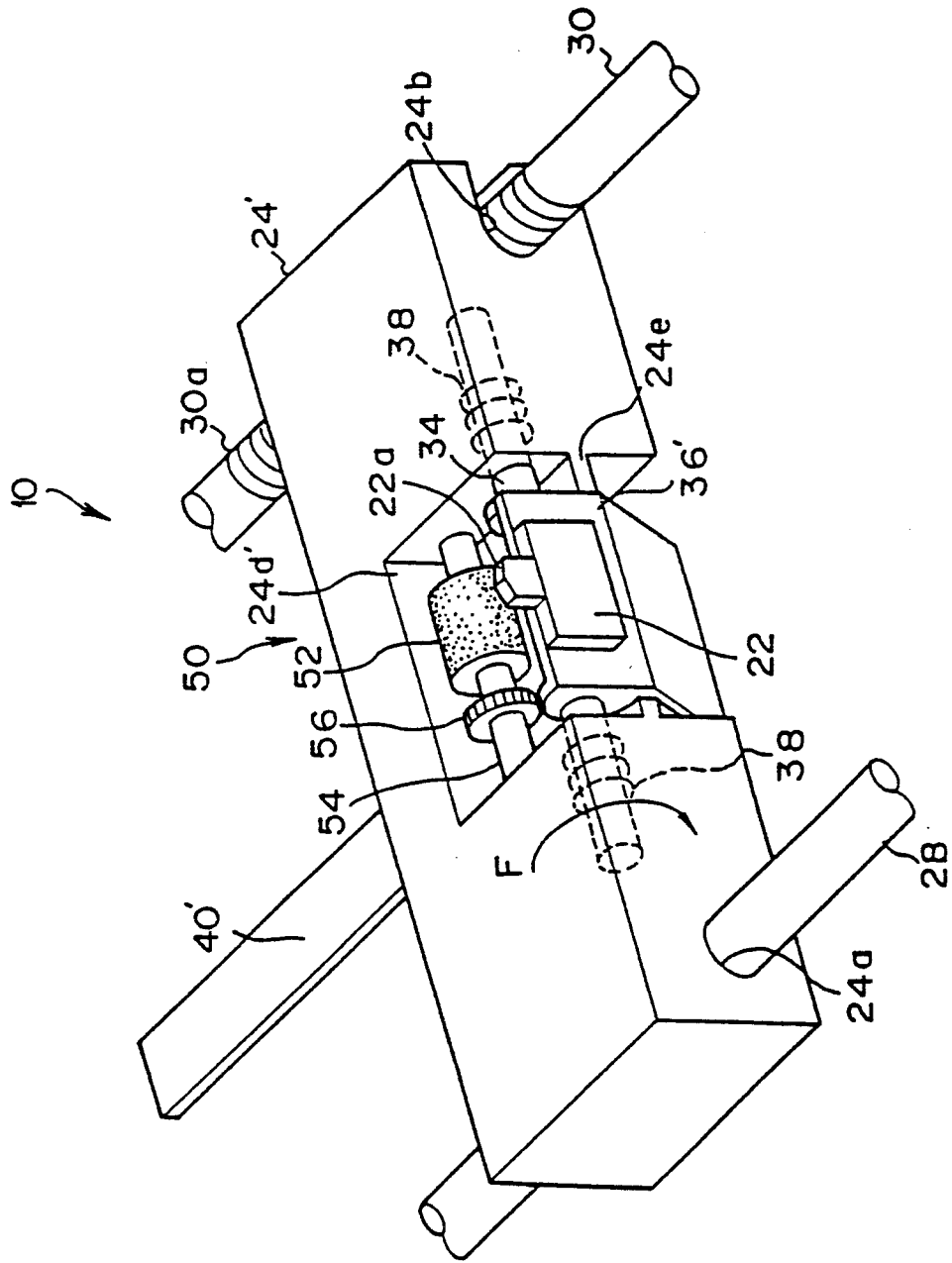
FIG. 7 is an enlarged fragmentary perspective view of a disk storage device according to another embodiment of the present invention, the view showing a mechanical structure of the disk storage device.
Figure 8:
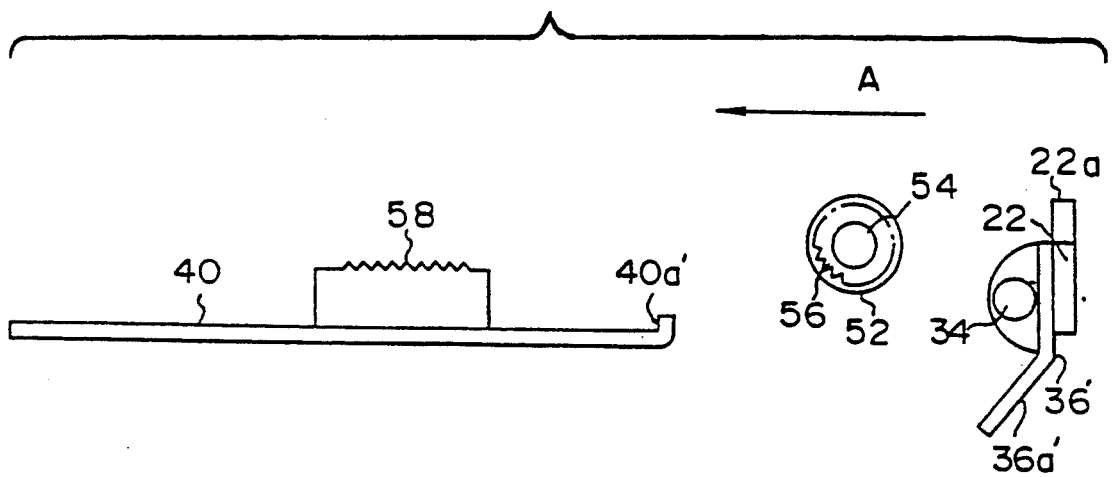
FIG. 8 is a side elevational view of a read/write head in an operative position and an engaging member engageable with a support plate of the read/write head in the disk storage device shown in FIG. 7.

Inoperative position: When the magnetic head 22 is in the inoperative position, as shown in FIGS. 5 and 6, the functional surface 22a thereof is positioned away from the disk surface, and accommodated in a recess 24d defined in the upper surface 24c of the carriage 24. In the inoperative position, the magnetic head 22 is kept out of contact with the surroundings, and protected from damage or dirt. The inoperative position may be referred to as a retracted position, in which the magnetic head 22 is retracted away from the disk surface.

The direction in which the support plate 36 is angularly moved to move the magnetic head 22 from the operative position to the inoperative position will be referred to as a first direction, whereas the direction in which the support plate 36b is angularly moved to move the magnetic head 22 from the inoperative position to the operative position will be referred to as a second direction.

The disc storage device 10 also has an actuator mechanism for actuating the support mechanism 32 to move the magnetic head 22 between the nonretractable operative position and the retracted inoperative position. The actuator mechanism will be described in detail below.

The actuator mechanism includes a pair of springs 38 disposed around the opposite ends of the pivot shaft 34 which are disposed in the carriage 24. The springs 38 engage the pivot shaft 34 and the carriage 24 such that they normally urge the pivot shaft 34 to rotate about its own axis in the direction indicated by arrow F in FIGS. 2 and 3, to angularly move the support plate 36 in the second direction. The carriage 24 has a stop 24e (FIG. 3) for engaging the support plate 36 to define a limit position for the support plate 36 in the second direction. When the support plate 36 is held against the stop 24e under the bias of the springs 38, the magnetic head 22 is in the operative position.

The actuator mechanism also includes an engaging member 40 mounted on the base 12 for engagement with the support plate 36. The support plate 36 supports the magnetic head 22 at one end thereof which is supported on the pivot shaft 34. The support plate 36 includes a slanted portion 36a extending from the supported end of the support plate 36, and a parallel end portion 36b bent from the slanted portion 36a and extending remotely from and parallel to the supported end of the support plate 36. The engaging member 40 is in the form of a bent slender strip of metal extending in the direction in which the carriage 24 is movable, i.e., along the rods 28, 30. The engaging member 40 has an upwardly projecting engaging end portion 40a near the spindle 18 for engaging the slanted portion 36a and parallel portion 36b of the support plate 36, and an opposite cover end portion 40b bent upwardly and horizontally parallel to the upper surface 2a of the base 2 toward the spindle 18.

As shown in FIG. 2, the carriage 24 has a recess 24f defined in a lower surface thereof and a recess 24g defined in an upper surface thereof. The recesses 24f, 24g prevent the carriage 24 from physically interfering with the engaging end portion 40a and the cover end portion 40b when the carriage 24 moves along the rods 28, 30.

Operation of the disk storage device 10 will now be described. When the carriage 24 is positioned radially inwardly to keep the magnetic head 22 in the access region, the support plate 36 is held against the stop 24e under the bias of the springs 38, holding the magnetic head 22 in the nonretractable operative position. When the carriage 24 is moved radially outwardly in the direction indicated by arrow A (FIG. 4), so as to move the magnetic head 22 from the access region to the data-free region, the actuator mechanism actuates the support mechanism 32 to angularly move the support plate 36 in the first direction, thereby angularly displacing the magnetic head 22 from the operative position into the retracted inoperative position.

More specifically, as the carriage 24 is moved radially outwardly along the rods 28, 30, the engaging end portion 40a of the engaging member 40 first engages the slanted portion 36a of the support plate 36 immediately after the magnetic head 22 leaves the access region. Upon continued radial outward movement of the carriage 24, the engagement between the engaging end portion 40a and the slanted portion 36a causes the support plate 36 to swing about the pivot shaft 36b in the first direction against the bias of the springs 38. The magnetic head 22 is now retracted into the the recess 24d in the upper surface of the carriage 24. In response to a further radial outward movement of the carriage 24, the engaging end portion 40a engages the parallel end portion 36b, so as to keep the magnetic head 22 in the recess 24d, and the magnetic head 22 is brought into a position immediately underneath the cover end portion 40b of the engaging member 40. The magnetic head 22 is now in the data-free region (FIG. 6). The cover end portion 40b virtually covers the magnetic head 22 which is in the data-free region, i.e., the retracted inoperative position, thus protecting the magnetic head 22 against damage or dirt and dust. While the magnetic head 22 is already protected against damage or dirt and dust when it is retracted into the recess 24d, the cover end portion 40b gives additional protection to the magnetic head 22.

When the carriage 24 is moved radially inward along the rods 28, 30 to move the head 22 from the data-free region to the access region, the actuator mechanism allows the support plate 36 to swing in the second direction. The support plate 36 and the magnetic head 22 are now angularly moved from the inoperative position to the operative position. More specifically, as the carriage 24 is moved radially inward, the support plate 36 disengages from the engaging end portion 40a of the engaging member 40 before the magnetic head 22 enters the access region, whereupon the support plate 36 swings in the second direction under the bias of the springs 38, so that the magnetic head 2 is brought into the operative position.

A disk storage device 10' according to another embodiment of the present invention will be described below with reference to FIGS. 7 through 10.

The disk storage device 10' differs from the disk storage device 10 according to the previous embodiment in that the carriage, the support plate, and the engaging member have modified configurations and a head cleaning member is added. The other details of the disk storage device 10' are identical to those of the disk storage device 10. Those parts of the disk storage device 10' which are identical to the corresponding parts of the disk storage device 10 are denoted by identical reference characters, and the modified parts of the disk storage device 10' are denoted by the corresponding reference characters with a prime.

Engaging member 40' differs from the engaging member 40 of the previous embodiment in that the engaging member 40' has no cover end portion. Support plate 36' differs from the support plate 36 of the previous embodiment in that the support plate 36' has a differently shaped engaging portion 36a that is engageable with the engaging end portion 40a' of the engaging member 40'. Recess 24d' of the carriage 24' is shaped to accommodate therein a head cleaning mechanism 50 for cleaning functional surface 22a of magnetic head 22. Most importantly, the disk storage device 10' additionally has the head cleaning mechanism 50.

The head cleaning mechanism 50 includes a cleaning roller 52 which contacts and cleans the functional surface 22a of the magnetic head 22 when the magnetic head 22 is in the inoperative position. The cleaning roller 52 is positioned such that a portion facing the disk is spaced from the disk to avoid physical interference with the disk. The cleaning roller 52 is made of a material such as felt suitable for wiping the magnetic head 2 in contact therewith. The cleaning roller 52 is associated with a rotating mechanism which rotates the cleaning roller 52 in response a radial movement of the carriage 24' along rods 28, 30.

More specifically, the rotating mechanism includes a shaft 54 rotatably supported on the carriage 24', and a gear 56 that is fixed concentrically to the shaft 54. The cleaning roller 52 is also fixed concentrically to the shaft 54 adjacent to the gear 56. A rack 58 is fixedly mounted on the upper surface of the engaging member 40'. Therefore, the rack 58 is supported on the upper surface of the base 12. The rack 58 extends in the direction in which the carriage 24' moves, i.e., along the rods 28, 30. When the carriage 24' is positioned radially outwardly, the rack 58 meshes with the gear 56. The carriage 24' has a recess 24f defined in the lower surface thereof to avoid physical interference with the engaging member 40' and the rack 58.

Figure 9:
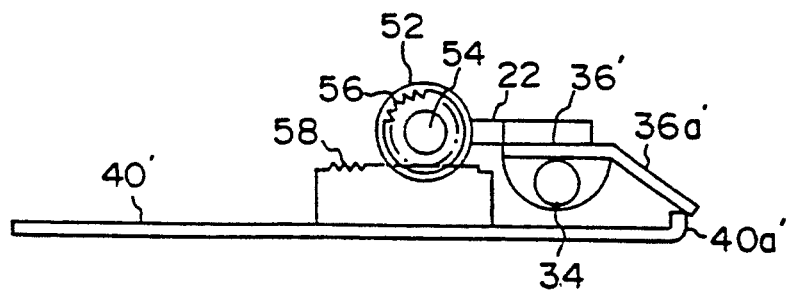
FIG. 9 is a side elevational view of the read/write head in an inoperative position, the engaging member, and a head cleaning member in the disk storage device shown in FIG. 7.
Figure 10:
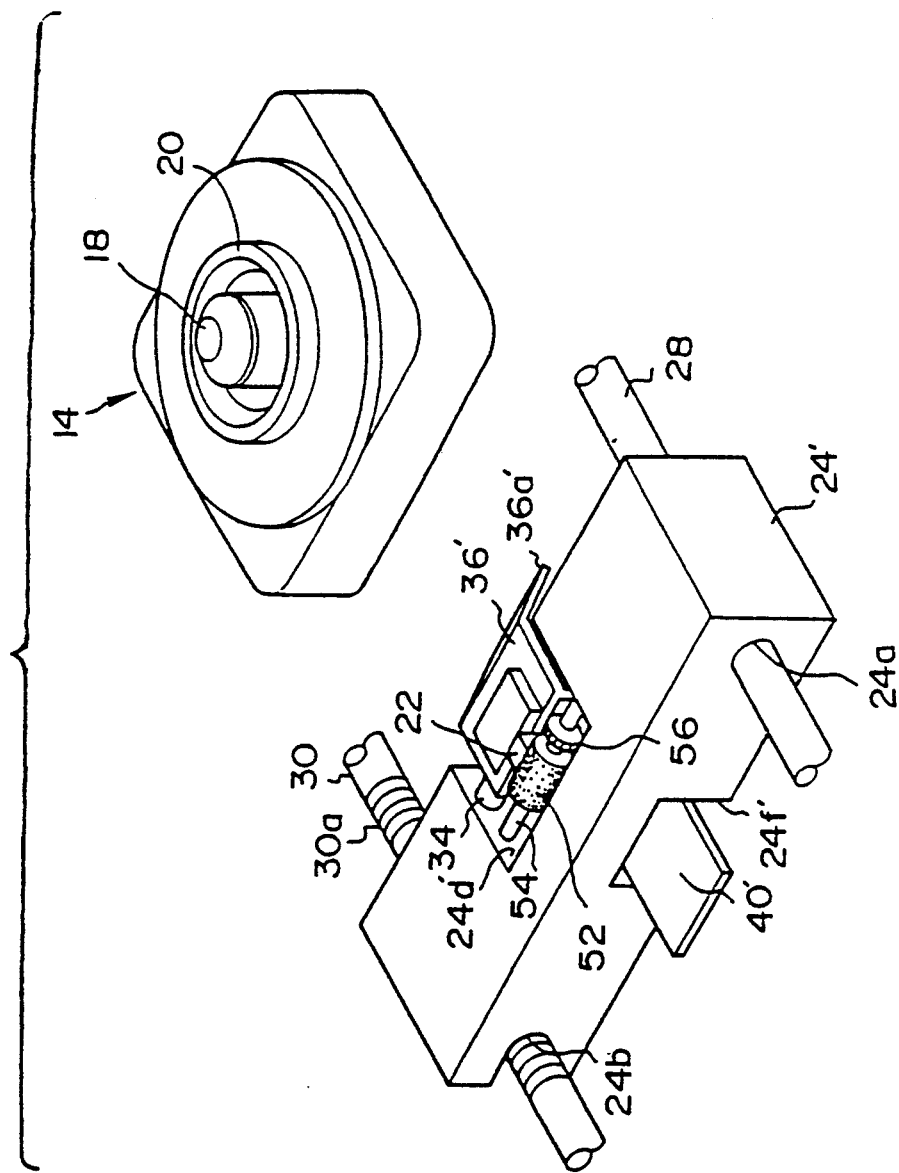
FIG. 10 is an enlarged fragmentary perspective view of the read/write head in the inoperative position, the engaging member, and the head cleaning member in the disk storage device shown in FIG. 7.

The disk storage device 10' operates as follows: When the carriage 24' moves radially inwardly or outwardly, the engaging portion 36a' of the support plate 36' disengages from or engages the engaging end portion 40a' of the engaging member 40', angularly moving the support plate 36' in the second direction or the first direction. Therefore, the magnetic head 22 is brought into the operative position (FIGS. 7 and 8) or the inoperative position (FIGS. 9 and 10).

In the data-free region, the engaging portion 36a' of the support plate 36 engages the engaging end portion 40a' of the engaging member 40' to bring the magnetic head 22 into the inoperative position. The functional surface 22a of the magnetic head 22 is held in contact with the cleaning roller 52, which removes dirt and dust from the functional surface 22a. Furthermore, as the magnetic head 22 is angularly moved from the operative position to the inoperative position, while the carriage 24' is angularly moving radially outwardly, the rack 58 meshes with the gear 56 so as to rotate the cleaning roller 52. Since the functional surface 22a of the magnetic head 22 is contacted by successive surface areas of the cleaning roller 52, the functional surface 22a is effectively cleaned by the cleaning roller 52. The magnetic head 22 is also cleaned when the carriage 24' returns radially inwardly along the rods 28, 30. Inasmuch as the magnetic head 22 is automatically cleaned by the cleaning roller 52 in response to the movement of the carriage 24' to move the magnetic head 22 between the access region and the data-free region, the user of the data storage device 10' is not required to manually clean the magnetic head 22.

If the amount of dirt or dust deposited on the magnetic head 22 is expected to be small, the cleaning roller 52 may be replaced with a nonrotatable cleaning piece of a desired configuration which may be fixed to the carriage or the base.

Although certain preferred embodiments have been shown and described, it should be understood that many changes and modifications may be made therein without departing from the scope of the appended claims.

I claim:

1. A disk storage device, comprising:
   a base;
   rotative drive means mounted on said base for rotating a data storage disk, said rotative drive means having a spindle for rotating said data storage disk;
   a read/write head for reading data from and writing data to said storage disk;
   a carriage that is movably mounted on said base, said read/write head being supported on said carriage;
   carriage moving means mounted on said base for radially moving said carriage between an inner access region and an outer data-free region;
   support means mounted on said carriage for retractably supporting said read/write head; and
   actuator means for actuating said support means to rotate said read/write head between a non-retractable operative position and a retracted inoperative position in which said read/write head is protected from damage or dirt, wherein said head is retracted to said retracted position when said carriage moves said head to said outer data-free region.

2. A disk storage device according to claim 1, wherein said carriage moving means comprises means for moving said carriage to move said read/write head between a radially inner access region and a radially outer data-free region, said actuator means comprising means for moving said read/write head from said operative position to said inoperative position when said read/write head is moved from said access region to said data-free region, and for moving said read/write head from said inoperative position to said operative position when said read/write head is moved from said data-free region to said access region.

3. A disk storage device according to claim 2, wherein said support means comprises a support plate that is angularly movably mounted on said carriage, said read/write head being supported on said support plate, said actuator means comprising means for angularly moving said support plate in a first direction to move said read/write head from said operative position to said inoperative position, and for angularly moving said support plate in a second direction to move said read/write head from said inoperative position to said operative position, and wherein said actuator means comprises spring means mounted on said carriage for biasing said support plate in said second direction, stop means mounted on said carriage for engaging said support plate under a bias of said spring means, thereby holding said read/write head in said operative position, and engaging means mounted on said base for engaging said support plate in response to a radially outward movement of said carriage with respect to said spindle, thereby angularly moving said support plate in said first direction against said bias of said spring means.

4. A disk storage device according to claim 1, further comprising means for substantially covering said read/write head so as to protect said read/write head when said read/write head is in said retracted inoperative position.

5. A disk storage device according to claim 1, further comprising means for cleaning a functional surface of said read/write head when said read/write head is in said retracted inoperative position.

6. A disk storage device according to claim 5, wherein said cleaning means comprises a cleaning member mounted on said carriage.

7. A disk storage device according to claim 6, wherein said cleaning member comprises a roller, said cleaning means further comprising roller rotating means for rotating said roller.

8. A disk storage device according to claim 7, wherein said roller rotating means comprises a shaft that is rotatably supported on said carriage, said roller being concentrically fixed to said shaft, a gear being fixed to said shaft, and a rack being mounted on said base and extending in a direction in which said carriage is movable, said gear being held in mesh with said rack, so that said roller can be rotated by said rack in response to a movement of said carriage.

9. A disk storage device, comprising:
a base;
rotative drive means mounted on said base for rotating a data storage disk, said rotative drive means having a spindle for rotating said data storage disk;
a head for at least reading data from said storage disk or writing data to said storage disk;
a carriage that is movably mounted on said base, said head being supported on said carriage;
carriage moving means mounted on said base for radially moving said carriage between an inner access region and an outer data-free region;
support means mounted on said carriage for retractably supporting said head;
means for actuating said support means to rotate said head between a non-retractable operative position and a retracted inoperative position, wherein said head is retracted to said retracted position when said carriage moves said head to said outer data-free region; and
a cleaning member that is mounted on said carriage for cleaning a functional surface of said head when said head is in said retracted inoperative position.

10. The disk storage device of claim 9, wherein said cleaning member comprises a roller and means for rotating said roller.

11. The disk storage device of claim 10, wherein said roller rotating means comprises a shaft that is rotatably supported on said carriage, said roller being concentrically fixed to said shaft, a gear being fixed to said shaft, and a rack being mounted on said base and extending in a direction in which said carriage is movable, said gear being held in mesh with said rack, so that said roller is rotated by said rack in response to a movement of said carriage.

12. The disk storage device of claim 9, wherein said carriage moving means comprises means for moving said carriage so as to move said head between a radially inner access region and a radially outer data-free region.

13. The disk storage device of claim 12, wherein said actuator means comprises means for moving said head from said operative position to said inoperative position when said head is moved from said access region to said data-free region, and for moving said head from said inoperative position to said operative position when said head is moved from said data-free region to said access region.

14. The disk storage device of claim 13, wherein said support means comprises a support plate that is angularly movably mounted on said carriage, said head being supported on said support plate, said actuator means comprising means for angularly moving said support plate in a first direction to move said head from said operative position to said inoperative position, and for angularly moving said support plate in a second direction to move said head from said inoperative position to said operative position, and wherein said actuator means comprises spring means mounted on said carriage for biasing said support plate in said second direction, stop means mounted on said carriage for engaging said support plate under a bias of said spring means, thereby holding said head in said operative position, and engaging means mounted on said base for engaging said support plate in response to a radially outward movement of said carriage with respect to said spindle, thereby angularly moving said support plate in said first direction against said bias of said spring means.

15. The disk storage device of claim 9, further comprising means for substantially covering said head so as to protect said head when said head is in said retracted, inoperative position.

16. A disk storage device, comprising:
a spindle for rotating a storage disk;
a head for at least reading data from said storage disk or writing data to said storage disk;
a carriage for radially moving said head between an inner access region and an outer data-free region;
means for rotating said head between a nonretractable operative position and a retracted inoperative position with respect to said storage disk wherein said head is retracted to said retracted position when said carriage moves said head to said outer data-free region; and
a cleaning member for cleaning a functional surface of said head when said head is in said retracted inoperative position.

17. The disk storage device of claim 16, further comprising a carriage that supports said head, said cleaning member being mounted on said carriage.

18. The disk storage device of claim 16, wherein said cleaning member comprises a roller and means for rotating said roller.

19. The disk storage device of claim 18, wherein a shaft is rotatably supported on a carriage, said roller being concentrically fixed to said shaft, a gear being fixed to said shaft, and a rack being mounted on a base and extending in a direction in which said carriage is movable, said gear being held in mesh with said rack, so that said roller is rotated by said rack in response to a movement of said carriage.

20. A disk storage device, comprising:
a data storage disk;
a head for accessing said data storage disk;
means for supporting said head for a radial movement with respect to said disk between a radially inner access region and a radially outer data-free region; and
means for actuating said supporting means to rotate said head between a non-retracted, operative position and a retracted, inoperative position, wherein said head is retracted to said retracted position when said supporting means supports said head in said outer data-free region.

21. The disk storage device of claim 20, further comprising a cleaning member for cleaning a functional surface of said head when said head is in said retracted, inoperative position.

22. The disk storage device of claim 21, wherein said cleaning member comprises a roller and means for rotating said roller.

* * * * *

UNITED STATES PATENT AND TRADEMARK OFFICE
CERTIFICATE OF CORRECTION

PATENT NO. : 5,243,591
DATED : September 7, 1993
INVENTOR(S) : M. MOGAMIYA

It is certified that error appears in the above-indentified patent and that said Letters Patent is hereby corrected as shown below:

At column 10, line 60 (claim 16, line 9) insert ---,--- after "storage disk".

Signed and Sealed this

Fourteenth Day of May, 1996

Attest:

BRUCE LEHMAN

*Attesting Officer*  *Commissioner of Patents and Trademarks*